Nov. 15, 1966   H. KLINGEL   3,285,101
ADJUSTING DEVICE FOR TOOL CARRIERS
Filed April 15, 1965   5 Sheets-Sheet 1

Inventor:
Hans Klingel
By
Walter Becker

Inventor:
Hans Klingel

Nov. 15, 1966  H. KLINGEL  3,285,101

ADJUSTING DEVICE FOR TOOL CARRIERS

Filed April 15, 1965  5 Sheets-Sheet 4

Inventor:
Hans Klingel
By Walter Becker

United States Patent Office 3,285,101
Patented Nov. 15, 1966

3,285,101
ADJUSTING DEVICE FOR TOOL CARRIERS
Hans Klingel, Stuttgart-Weilimdorf, Germany, assignor to Karl Huller G.m.b.H., Ludwigsburg, Germany
Filed Apr. 15, 1965, Ser. No. 448,391
Claims priority, application Germany, Apr. 17, 1964, H 52,393
31 Claims. (Cl. 77—3)

The present invention relates to a setting device for a tool carrier, especially for boring bars of fine boring machines, which are connected to a rotatable boring spindle.

When fine boring, the dimensional precision of the work piece is greatly affected by the wear of the tool. Setting and adjusting devices for compensating for the wear of the tool are known. Such devices are, for instance, through the intervention of measuring feelers automatically adjusted in such a way that a high precision of the machine bore will be obtained. One of such heretofore known adjusting devices comprises a tilting lever which is pivotable relative to the boring spindle about an axis which is perpendicular to the axis of rotation of the boring spindle. The said tilting lever carries the tool at one end thereof and has its other end tiltable to the required extent by means of an adjusting key in the boring spindle. That arm of the tilting lever which is located in the boring spindle is by means of a spring resting against the boring spindle pressed against said key so that said arm will, due to the spring force, rest against said key. The adjusting key in its turn is coupled to an adjusting device outside the boring spindle, said adjusting device being adapted to displace said key in axial direction of the boring spindle.

The drawback of this known arrangement consists in that the tilting axis of the tilting lever will, even if it has been machined with high precision, always have some play. This play is, with regard to the dimensional precision of the work piece to be machined, relatively great and amounts to a few thousandths of a millimeter so that with corresponding cutting power of the tool, a dimensional precision with tolerances of a few thousandths of a millimeter will no longer be possible. Furthermore, the spring which presses the tilting lever arm against the key, is due to the machining pressure compressed against its thrust to a slight extent so that so-called shatter marks may occur on the machined surface.

Another heretofore known adjusting device has an elbow lever in the boring spindle. The elbow joint of said elbow lever is located approximately in the axis of rotation of the boring spindle and is operatively connected with a pressure spindle displaceable axially in said boring spindle. Of the two arms of the elbow lever which extend approximately radially with regard to the axis of rotation of the boring spindle, one arm rests against a pressure screw, whereas the second arm rests on the tool to be adjusted which is located in a corresponding radial recess of the boring spindle. The tool is held fast in said recess by means of a clamping screw and is displaceable by slight amounts against the clamping force of said clamping screw. With this design of an adjusting device, the friction of the tool in the bore receiving the same may depend on the pressing force of the clamping screw, on the air temperature, humidity and other circumstances, so that the pressure spindle has to be pressed against the elbow joint with different force depending on the specific frictional force. In this way, an adjustment of the tool merely in conformity with an adjusting scale may be defective since the pressure spindle or the boring spindle receiving the same will, in conformity with the various pressures, expand or be compressed to a varying degree, and a uniform or pressure-free displacement of the tool in its recess will no longer be assured. With this arrangement, the tool can be adjusted by the elbow lever only in feeding direction, i.e. toward the outside, whereas the return of the tool can be effected only manually by loosening the clamping screw, loosening the pressure spindle, and subsequent returning movement of the tool.

It is, therefore, an object of the present invention to provide an adjusting device for tool carriers, which will overcome the above-mentioned drawbacks.

It is another object of this invention to provide an adjusting device of the above-mentioned type, which is so designed as to permit an adjustment of the tool within a wide range by slight amounts without affecting the machining precision.

It is a further object of this invention to provide an adjusting device as set forth in the preceding paragraphs which will permit adjustment of the tol in two directions, viz. away from the axis of the boring spindle and toward said axis without requiring a loosening of the tool or any other step or operation which might effect the adjustment of the tool.

It may also be added that with heretofore known adjusting devices of the type involved, a further drawback is encountered inasmuch as at the end of the machining operation, the tool cannot be withdrawn from the just-machined bore without causing slight grooves. This is due to the fact that the tool occupying its cuting position cannot be withdrawn.

It is, therefore, still another object of this invention to provide an adjusting device for tool carriers which will overcome the just-mentioned drawback.

It is a further object of the present invention to provide an adjusting device for a tool carrier, in which, during a machining operation, the tool is completely rigidly connected to the boring spindle and may be adjusted by amounts of less than $1/1000$ of a millimeter.

These and other objects and advantages of the invention will appear more clearly from the following specification in connection with the accompanying drawings, in which.

Figure 1:
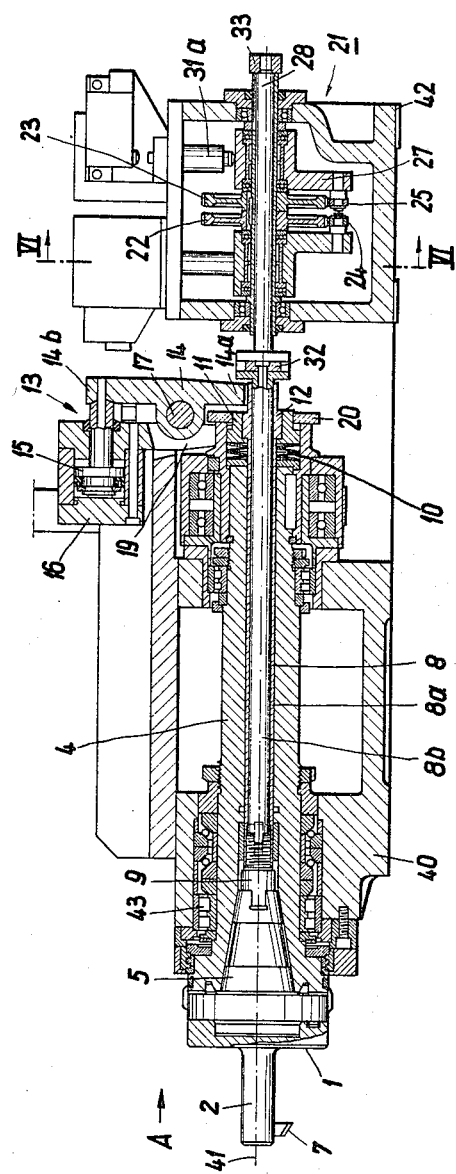
FIGURE 1 is a longitudinal section through an adjusting device according to the present invention.

With an adjusting device for tool carriers, especially for boring bars of fine boring machines, which are connected to a rotatable boring spindle, according to the present invention, the tool carrier is eccentrically journalled in the boring spindle, and the tool carrier and the boring spindle are rotatable relative to each other and adapted to be arrested in the respective adjusted position. Advantageously, the tool carrier has a cone journalled preferably in the boring spindle. This cone is axially adjustable and diverges toward the tool holder while in opposite direction being under the thrust of a spring. This arrangement makes it possible, in a simple manner, to set or adjust the radial distance of the cutting edge of the tool with regard to the axis of rotation of the boring spindle. It is merely necessary to rotate the tool carrier relative to the boring spindle.

Furthermore, the cone arranged in a corresponding conical seat of the boring spindle assures an absolutely rigid connection between the boring spindle and the tool carrier so that when machining work pieces, high dimensional precisions can be realized. By correspondingly selecting the eccentricity, the range of adjustment and the possible minimum adjustment of the tool carrier will be determined.

According to a further feature of the present invention, the adjustment of the tool carrier is effected by an adjusting bar in the form of a displaceable pipe while an adjusting shaft is journalled in said pipe. According to a further development of the present invention, the adjusting shaft has that end thereof which is remote from the tool carrier coupled to an adjusting device which is equipped with at least one ratchet wheel coupled to the adjusting shaft and having a pawl associated therewith. Advantageously, the said pawl is linked to an arm of an angle lever which is tiltable about the axis of the ratchet wheel. The second arm of said angle lever is operatively connected to a movable push-rod. Said push-rod may form the core of a moving coil and is adapted to move said pawl back and forth, for instance against the thrust of a spring, so that with each of these movements, the ratchet wheel will be adjusted by a ratchet tooth and will turn the cone by a corresponding angle. For purposes of adjusting the cone in both directions, two ratchet wheels with their teeth and pawls directed in opposite directions are coupled to the adjusting shaft, preferably by a cross or veneer coupling. The ratchet wheels are arranged on a shaft the free end of which has a handle or the like connected thereto and has a dial associated therewith to permit manual adjustment.

According to a further feature of the present invention, the angle lever receiving a pawl has associated therewith a further arm which is operatively connected to a further push-rod adapted to act upon the contact of an acknowledging switch. When the moving coil magnet receives a number of impules corresponding to the number of adjusting steps to be carried out, the acknowledging switch will, after each movement of the ratchet wheel give off an acknowledging impulse. Simultaneously with the switching-on impulse for the moving coil, a time relay is placed in readiness which normally, however, will not come into action. Only at the two end positions of the cone when no feeding and thus no acknowledgment is effected by the acknowledging switch, will said time relay respond and indicate the end position.

With an adjusting device for tool carriers, especially for boring bars of fine boring machines, which are connected to a rotatable boring spindle, the tool carrier according to the present invention is tiltable about an axis which extends approximately perpendicularly with regard to the longitudinal central axis of said tool carrier. If the tool carrier has, for instance, a cone which is detachably arranged in the boring spindle, the tool carrier can, following the loosening of the cone, be tilted about its tilting axis in such a way that the tool connected thereto can be withdrawn in spaced relationship to the machined surface and along the same. It is, of course, to be understood that the tool can be introduced into the work piece prior to the machining of the latter and can then be clamped. In this instance the feed will, during the machining operation, be directed away from the work piece. At any rate, a groove-free withdrawal of the work tool from the work piece will be assured. In order to be able safely to lift the tool off the machined surface, the work tool carrier is nearly in a direction opposite to the radial feeding direction of the tool under the force of a spring so that the tool will, after the tool carrier has been loosened, be automatically lifted off from the machined surface. The tiltability of the tool carrier about an axis which extends approximately perpendicularly with regard to its central axis is in a simple manner realized by a hinge member establishing connection between the tool carrier and the adjusting bar, the axis of said hinge member extending substantially perpendicularly with regard to the boring spindle.

Referring now to the drawings in detail, the arrangement shown therein comprises a boring spindle 4 which is journalled in a head stock 40 which through the intervention of keys 12 is arranged on a fine-boring machine. Boring spindle 4 is by means of a plurality of anti-friction bearings 43 (FIG. 3) journalled in head stock 40 so as to be rotatable about an axis 41. The free end of boring spindle 4 has connected thereto a boring bar 2 (FIGS. 1 and 2) which for purposes of machining a work piece carries a cutting tool 7.

Figure 2:
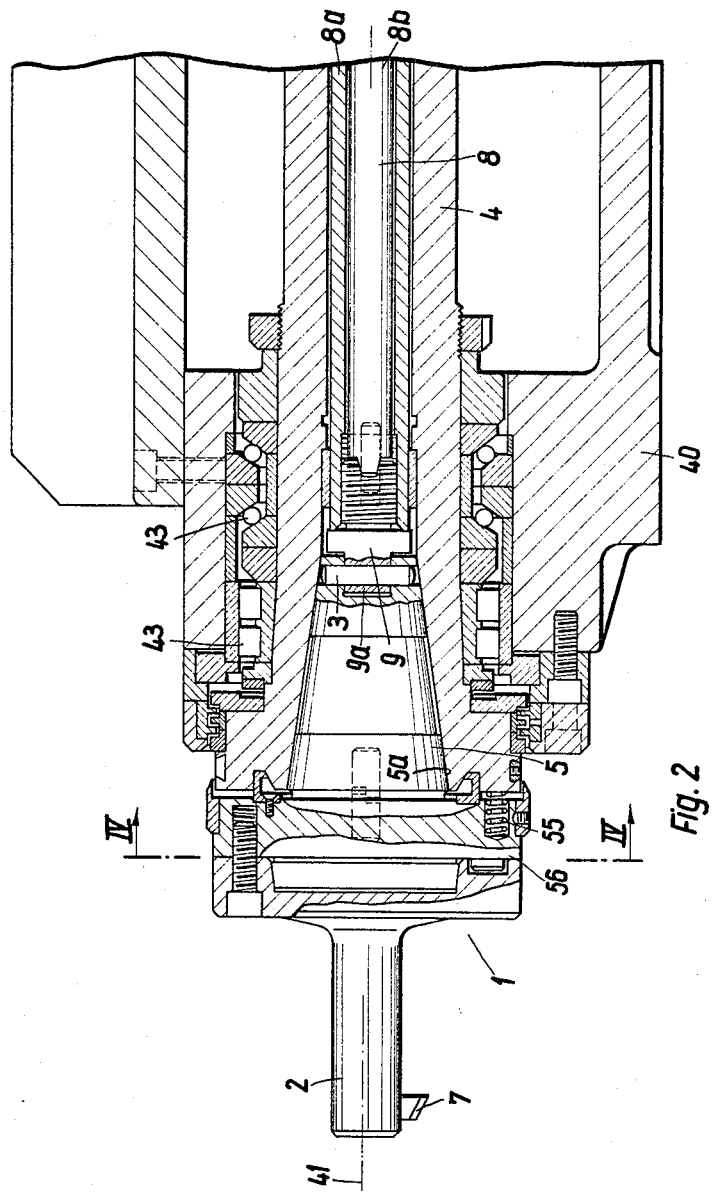
FIGURE 2 illustrates on a larger scale than that of FIGURE 1 the left-hand portion of FIGURE 1.
Figure 4:
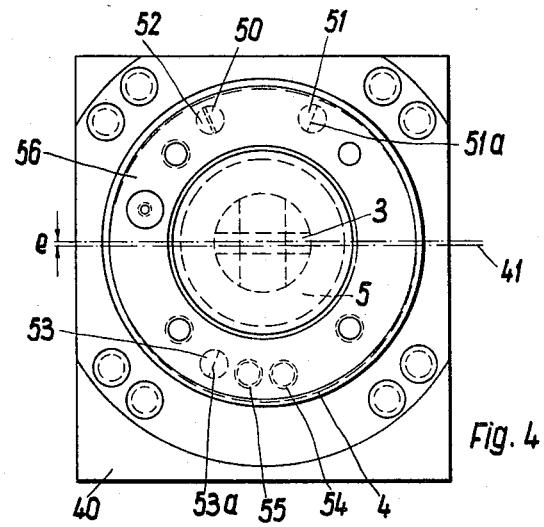
FIGURE 4 is an end view of FIGURE 2 as seen along the line IV—IV of FIGURE 2.

As will be seen from FIG. 2, boring bar 2 is rigidly connected to a cone 5 which diverges in the direction toward the boring bar 2 and is journalled in a corresponding conical seat 5a in boring spindle 4. The longitudinal central axis of cone 5 and conical seat 5a is, as indicated in FIG. 4, offset by an amount of approximately $\frac{1}{200}$ of a millimeter while extending parallel to the axis of rotation 41 of boring spindle 4. When cone 5 is freed from its seat 5a in boring spindle 4, it can be rotated whereby the radial distance of the cutting edge of tool 7 varies with regard to the axis of rotation 41 of boring spindle 4 over an angle of 180° along a sine curve. By subdividing the maximum available angle of rotation of 180°, an adjustment of the tool 7 can be effected in two directions with an eccentricity of a few hundredths of a millimeter by smallest fractions of this amount.

Figure 3:
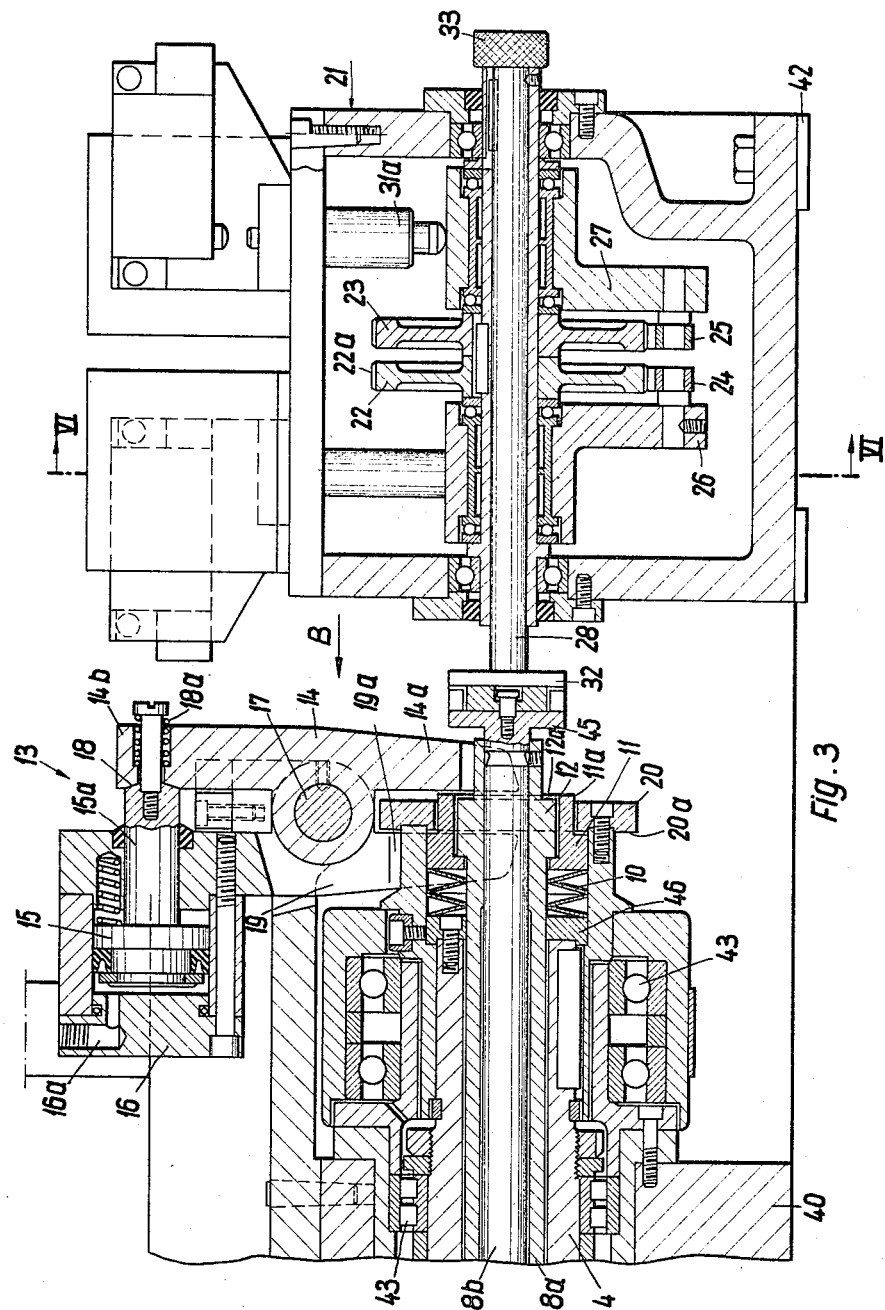
FIGURE 3 illustrates the right-hand portion of FIGURE 1 but likewise on a larger scale than that of FIGURE 1.

For turning cone 5 and freeing the same from its seat, cone 5 is coupled to an adjusting bar 8 which is approximately coaxial with cone 5 and is journalled in boring spindle 4. Adjusting bar 8 has its rear end provided with a coupling 45, as shown in FIG. 3. By axially displacing adjusting bar 8, cone 5 can be pushed out or pulled into its conical seat 5a. By rotating adjusting bar 8, tool 7 can be adjusted.

As will be evident from FIGS. 2 and 3, adjusting bar 8 comprises substantially a tube 8a having journalled therein a shaft 8b. Within the range of the rear end of boring spindle 4, tube 8a has an enlarged diameter in the form of a collar 12. That end face of collar 12 which faces toward boring bar 2 has adjacent thereto a clamping bushing 11 which is axially displaceably mounted in boring spindle 4. Between clamping bushing 11 and a plate 46 which corresponds in diameter to the clamping bushing 11 and is fixedly connected to boring spindle 4, there are dish-springs 10 on tube 8a. The said springs 10 pull cone 5 through the intervention of adjusting bar 8 into its conical seat 5a so that cone 5 is firmly held therein.

Figure 5:
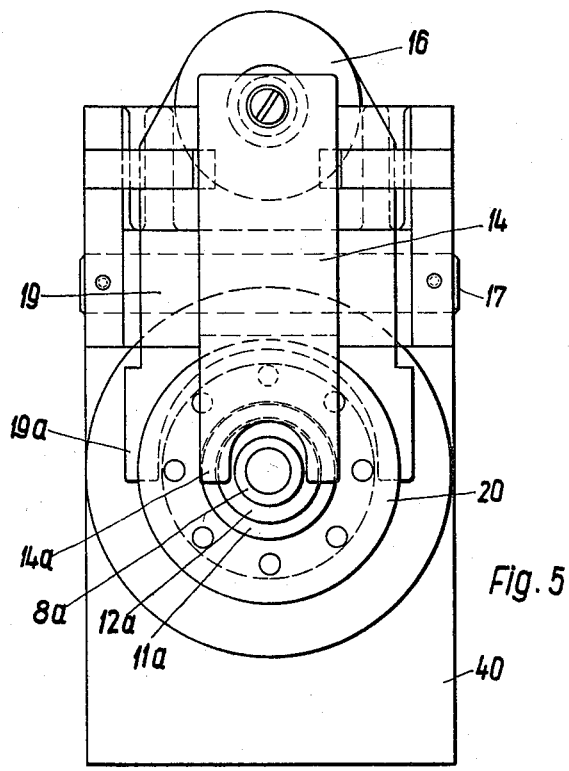
FIGURE 5 is an end view of FIGURE 3 as seen in the direction of the arrow B therein.

In order to permit relieving cone 5 from its seat, a relieving or detaching device 13 fixedly mounted on head stock 40 is arranged within the range of the rear end of boring spindle 4. The device 13 has two tiltable levers 14 and 19 which are tiltable about an axis 17 extending perpendicularly with regard to the axis 41. These levers 14 and 19 embrace in a plier-like manner an annular plate 20 at opposite sides thereof, said plate being arranged at the rear end face of boring spindle 4. Both levers 14 and 19 are in conformity with FIG. 5 provided with jaws so that for purposes of a better engagement, embrace the end of tube 8a and boring spindle 4. A cylinder 16 (FIG. 3) is connected to lever 19 for actuating the two two-arm levers 14 and 19. Piston 15 reciprocable in cylinder 16 is connected to lever 14 through the intervention of a piston rod 15a. When fluid under pressure is conveyed into cylinder 16 through an inlet opening 16a, fluid, for instance oil, is pressed into cylinder 16 so that piston 15 and cylinder 16 move away from each other and the two arms 14a and 19a facing spindle 4 and pertaining to levers 14 and 19 respectively are moved toward each other. The connection between piston rod 15a and lever 14 is formed by a ball joint 18 the bearing pressure of which is aided by a spring 18a.

As will be evident from FIG. 3, clamping bushing 11 protrudes in axial direction of spindle 4 to a greater extent than collar 12 from a disc 20 which is fixedly connected to boring spindle 4. The end faces 11a and 12a of clamping bushing 11 and collar 12 respectively are designed as engaging surfaces for lever arm 14a. Lever arm 19a is adapted to engage those end faces 20a of disc 20 which are located opposite to end faces 11a and 12a. When, as described above, lever arms 14a and 19a are by pressure cylinder 16 and piston 15 moved toward each other, said lever arms will with the same force engage the end faces 11a, 12a, 20a, associated therewith. During the further course of this movement, lever arm 14a lifts clamping bushing 11 from collar 12 against the thrust of dish-springs 10 whereupon lever arm 14a will also engage the end face 12a of collar 12 and will displace collar 12 in the axial direction of boring spindle 4. The arrangement of the plier-shaped detaching device 13 will assure that when loosening or detaching cone 5, the pressure force required for this purpose against the thrust of springs 10 will not have to be absorbed by bearings 43 of boring spindle 4 and that during the loosening of cone 5 by the device 13, boring spindle 4 will be acted upon in both directions by forces which will balance each other. When cone 5 has been pushed out of its seat 5a by the device 13, cone 5 can be turned through the intervention of shaft 8b and by relieving pressure cylinder 16 of device 13, cone 5 can again be placed under pressure by the force of dish-springs 10.

Figure 6:
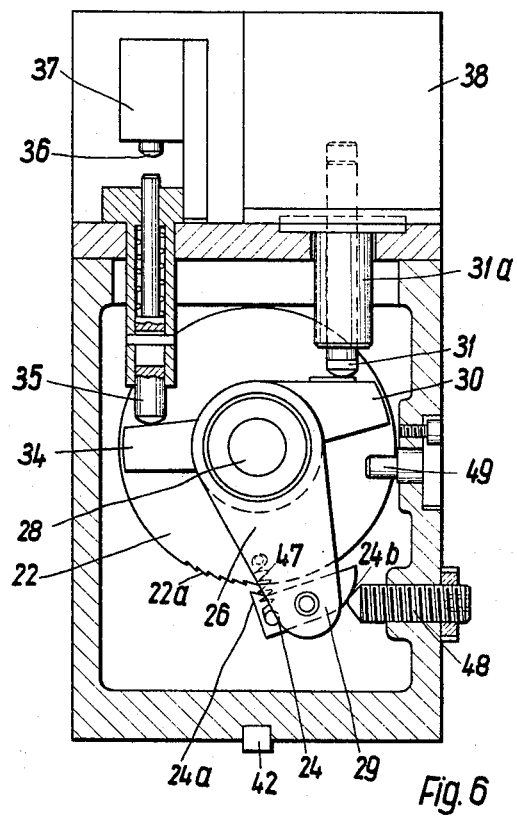
FIGURE 6 is a section taken along the line VI—VI of FIGURE 3.

For purposes of permitting rotation of cone 5, adjusting shaft 8b is in conformity with FIGS. 3 and 6 coupled to an adjusting device 21. The adjusting device which is likewise connected to a fine-boring machine comprises a shaft 28 which is coaxial with the adjusting bar 8b and is rotatably journalled in a corresponding housing. Shaft 28 has fixedly connected thereto two ratchet wheels 22 and 23 the circumferential teeth 22a of which have associated therewith pawls 24 and 25 respectively (FIG. 3). Pawls 24 and 25 are each tiltably aranged on a lever 26, 27 respectively rotatable about the axis of rotation of shaft 28. Each of the approximately T-shaped levers 26 and 27 has three arms 29, 30 and 34, transverse arm 29 carrying pawls 24 and 25. As will be evident from FIG. 6, the two lever arms 30 and 34 which are substantially at a right angle with regard to transverse arm 29 are extending substantially in horizontal direction when they occupy their rest position. A push-rod-shaped core 31 of a movable coil magnet 38 engages arm 30, whereas arm 34 is engaged by a movable push-rod 35.

Arranged above push-rod 35 within the range of that end face thereof which is remote from arm 34 there is provided a contact 36 pertaining to an acknowledging switch 37. When magnet 38 moves core 31 downwardly, the entire lever 26 tilts in clockwise direction. As a result thereof, ratchet nose 24a of pawl 24 moves ratchet wheel 22 by an adjusting step in clockwise direction, said nose 24a being acted upon by a tension spring 47. At the same time, and during this movement, push-rod 35 is moved upwardly so that it actuates contact 36 of acknowledging switch 37, as a result of which the latter sends off an acknowledging impulse. An arrangement of the type just described is, of course, also associated with ratchet wheel 23. However, with ratchet wheel 23, the teeth and pawl 25 are arranged in opposite direction so that ratchet wheel 23 will in response to the actuation of a core 31a associated therewith be moved by an adjusting step in counter-clockwise direction. For purposes of adjusting the amount of the respective adjusting steps, pawls 24 are designed as two-arm levers tiltably journalled in arm 29 of lever 26. Pawls 24 have their faces 24b which are diagonally opposite to nose 24a engage a setting screw 48 which threadedly engages the housing of the adjusting device. For the same purpose, also in that range of arm 30 which is located opposite to magnet core 31 there is an abutment 49 eccentrically located in housing which abutment determines the maximum turning angle of lever 26.

The design of the adjusting device according to the present invention makes it possible to adjust cone 5 in relieved condition by minute amounts in clockwise and counterclockwise direction with regard to boring spindle 4. Each feeding movement is acknowledged by a limit switch. Simultaneously with the switch-on impulse for the magnet, a time relay is energized which normally, however, will not perform its function. Only when cone 5 has reached either one of its end positions after a movement through 180°, when no feeding and thus no acknowledgment is effected by the limit switch, will the time relay respond and announce the end position. The adjustment can, of course, also be effected automatically through the control of a pneumatic or electric measuring device which measures the actual dimension of the machined bore and conveys the necessary adjusting impulses to the adjusting device. For permitting manual adjustment, that end of shaft 28 which is remote from coupling 32 is provided with a handle 33. FIG. 4 shows abutments 50 to 53 which limit the possible rotation of cone 5 relative to spindle 4 to an angle of 180°. The said abutments are formed by flattened cylindrical pins. Two pins are fastened to the front end face of the boring spindle and two pins are connected to collar 56 of cone 5 the end face of which faces the end face of the boring spindle. All abutments 50 to 53 are located on a circle which is coaxial with regard to the longitudinal central axis of cone 5. According to FIG. 4, an abutment of cone 5 engages a corresponding abutment 52 of boring spindle 4, whereas the two other abutments, viz abutment 51 connected to the cone and abutment 55 connected to the boring spindle have their abutting surfaces 51 and 53a spaced from each other by 180° so that two abutting surfaces 51a and 53a are located in a common diametrical plane extending through the axis of the cone. When cone 5 is turned in rightward direction in conformity with FIG. 4, the maximum angle of rotation until abutment 51 engages abutment 53 will amount to 180°. In this instance, the second abutment 50 of cone 5 is moved away from abutment 52 of boring spindle 4 by an angle of 180°.

According to a further development of the present invention and as shown in FIG. 2, cone 5 is through the intervention of a pin 3 tiltably connected to adjusting bar 8. Pin 3 the axis of which extends perpendicularly with regard to the longitudinal central axis of boring spindle 4 is journalled in a hinge member 9 which threadedly engages and is connected to tube 8a of adjusting bar 8. That end of cone 5 which faces hinge member 9 is slotted in such a way that it embraces a plate 9a pertaining to hinge member 9 and receiving pin 3, the said end of cone 5 being penetrated by pin 3. For purposes of clarity, hinge pin 3 is in FIG. 2 shown as being turned by 90°. Actually, the axis of pin 3 is perpendicular to tool 7 so that said tool can be lifted off from the machined surface when cone 5 is turned about pin 3. The lifting off of tool 7 is in the illustrated example effected automatically by two pressure springs 54 and 55 (FIGS. 2 and 4) which are mounted in collar 56, said springs resting against the end face of boring spindle 4. Such an arrangement has the advantage that for purposes of withdrawing tool 7 from a machined bore, the tool will not cause any grooves in the machining surface but will move along the same in spaced relationship thereto. The adjusting device according to the present invention permits the adjustment of a tool 7 over a wide range by small amounts in opposite directions. Inasmuch as the boring bar 2 is mounted on the adjusting device, the dimensions of the boring bar, especially its diameter, can be adapted to the respective requirements.

As will be seen from the above, the levers of the cone relieving device which from both sides engage the boring spindle in axial direction will assure that their pressure will not be conveyed to the sensitive bearings for the bearing spindle and that the boring spindle will be entirely relieved during the adjustment of the cone.

The adjusting device according to the present invention permits the machining of work pieces with a maximum of precision and an optimum surface quality. The adjusting device may be controlled through the intervention of a measuring device which ascertains the dimensions of the machined bore and conveys the necessary adjusting impulses to the adjusting device which will then rotate the cone relative to the boring spindle through the intervention of the ratchet wheels. The adjustment of the tool by rotation of the cone is, as mentioned, effected along a sine curve over 180°.

It is, of course, to be understood that the present invention is, by no means, limited to the particular constructions described above but also comprises any modifications within the scope of the appended claims.

What I claim is:

1. An adjusting device for tool carriers, especially for boring bars of fine-boring machines, which includes: a spindle head, a boring spindle rotatably journalled in said spindle head and held therein against axial movement, said boring spindle being provided with a hollow conical section at one end, a tool carrier supported by said boring spindle at said one end of the spindle and provided with a conical portion seated in said conical section, said conical section and conical portion tapering outwardly toward said tool carrier, said tool carrier being eccentrically arranged with regard to the axis of said boring spindle, said tool carrier and said boring spindle being rotatably adjustable with regard to each other, and means connected to said spindle head and to said tool carrier selectively operable for axially adjusting said tool carrier in said boring spindle in a direction to unseat said conical portion from said conical section.

2. An adjusting device for tool carriers according to claim 1, in which said means includes adjusting bar means extending through said boring spindle in coaxial relation thereto and connected at one end to said tool carrier, and actuating means connected to the other end of said bar means and mounted on said spindle head.

3. An adjusting device for tool carriers, especially for boring bars of fine-boring machines, which includes: a spindle head, a boring spindle rotatably journalled in said spindle head and comprising a hollow section with a conical bore extending in axial direction of said spindle, a tool carrier provided with a conical section rotatably and axially adjustably arranged in said conical bore, said conical section of said conical bore diverging in the direction toward said tool carrier, said tool carrier and said boring spindle being arranged eccentrically with regard to each other, an adjusting bar extending through said boring spindle and connected to said tool carrier, a clamping bushing axially displaceable in said boring spindle and surrounding said adjusting bar, said clamping bushing being provided with a collar, spring means respectively resting against said collar and said adjusting bar and continuously urging said conical section into said conical bore in the tapering direction of the latter, and relieving means operatively connected to said conical section for unseating the same from said conical bore, said relieving means includes lever means operable to actuate said adjusting bar in axial direction of the latter.

4. An adjusting device for tool carriers, especially for boring bars of fine-boring machines, which includes: a spindle head, a boring spindle rotatably journalled in said spindle head, a tool carrier, a conical member connected to said tool carrier and diverging in the direction toward the same, said boring spindle having an axial bore therethrough with a conical section corresponding to said conical member for receiving and seating the same, said tool carrier and said boring spindle being arranged eccentrically with regard to each other and being axially and rotatably movable relative to each other, and adjusting bar connected to said conical member, spring means associated with said adjusting bar and continuously urging the same in a direction away from said tool carrier, fluid pressure operable means, and a relieving device operatively connected to said conical member for relieving the same from firm engagement with said conical bore section, said relieving device including two-arm lever means having one arm for engagement with said adjusting bar and having another arm operatively connected to said fluid pressure means.

5. An arrangement according to claim 4, in which said two-arm lever means is tiltable about an axis substantially perpendicular to the axis of said boring spindle while being spaced therefrom.

6. An arrangement according to claim 4, in which said fluid pressure operable means includes a pressure cylinder arranged substantially parallel to the axis of said boring spindle and also includes a piston rod linked to said two-arm lever means.

7. An adjusting device for tool carriers, especially for boring bars of fine-boring machines, which includes: a spindle head, a boring spindle rotatably journalled in said spindle head, a tool carrier, a conical member connected to said tool carrier and diverging in the direction toward the same, said boring spindle having an axial bore therethrough with a conical section corresponding to said conical member for receiving and seating the same, said boring spindle also including abutment means, said tool carrier and said boring spindle being arranged eccentrically with regard to each other and being axially and rotatably movable relative to each other, an adjusting bar connected to said conical member, spring means associated with said adjusting bar and continuously urging the same in a direction away from said tool carrier, fluid pressure operable means including a cylinder and a piston reciprocable therein, and a relieving device operatively connected to said conical member for relieving the same from firm engagement with said conical boring section, said relieving device including two-arm lever means having the two arms thereof arranged in the manner of pliers, one of said arms being operatively connected to said cylinder for engagement with said abutment means, and the other one of said arms being operatively connected to said piston.

8. An arrangement according to claim 7, in which said two arms are pivotable about a common axis.

9. An adjusting device for tool carriers, especially for boring bars of fine-boring machines, which includes: a spindle head, a boring spindle rotatably journalled in said spindle head, a tool carrier supported by said boring spindle and eccentrically arranged with regard thereto, said tool carrier and said boring spindle being rotatably adjusted with regard to each other, means for holding said spindle and said tool carrier in their respective adjusted relative position with regard to each other, and adjusting bar means extending through said boring spindle and connected to said tool carrier for adjusting the same relative to said boring spindle, said adjusting bar means including a displaceable tube and an adjusting shaft rotatably journalled in said tube.

10. An arrangement according to claim 9, in which said tube has that end portion thereof which is adjacent said tool carrier provided with a hinge member, and in which said tube has another portion thereof spaced from said end portion provided with a collar.

11. An adjusting device for tool carriers, especially for boring bars of fine-boring machines, which includes: a spindle head, a boring spindle rotatably journalled in said spindle head, a tool carrier supported by said boring spindle and eccentrically arranged with regard thereto, said tool carrier and said boring spindle being rotatably adjustable with regard to each other, means for holding said spindle and said tool carrier in their respective adjusted relative position with regard to each other, adjusting bar means extending through said boring spindle and connected to said tool carrier for adjusting the same relative to said boring spindle, said adjusting bar means including a displaceable tube and an adjusting shaft rotatable in said tube, and an adjusting device coupled to that end portion of said adjusting shaft which is remote from said tool carrier.

12. An arrangement according to claim 11, in which said adjusting device includes at least one ratchet wheel coupled to said adjusting shaft, and also includes a pawl for cooperation with said ratchet wheel.

13. An arrangement according to claim 12, which includes push-rod means for actuation of a control device, a shaft connected to said ratchet wheel and also includes an angle lever having one arm linked to said last-mentioned shaft and having its other arm in operative engagement with said push-rod means.

14. An arrangement according to claim 13, in which said push-rod means forms the core of a movable coil magnet.

15. An adjusting device for tool carriers, especially for boring bars of fine-boring machines, which includes: a spindle head, a boring spindle rotatably journalled in said spindle head, a tool carrier supported by said boring spindle and eccentrically arranged with regard thereto, said tool carrier and said boring spindle being rotatably adjustable with regard to each other, means for holding said spindle and said tool carrier in their respective adjusted relative position with regard to each other, adjusting bar means extending through said boring spindle and connected to said tool carrier for adjusting the same relative to said boring spindle, said adjusting bar means including a displaceable tube and an adjusting shaft rotatable in said tube, an adjusting device coupled to that end portion of said adjusting shaft which is remote from said tool carrier, said adjusting device including at least one ratchet wheel coupled to said adjusting shaft and also including a pawl for cooperation with said ratchet wheel, first push-rod means for actuation of a first control device, a shaft connected to said ratchet wheel, an angle lever having one arm linked to said last-mentioned shaft and having its other arm in operative engagement with said first push-rod means, and second push-rod means for actuation of a second control device, said angle lever comprising an additional arm for operative engagement with said second push-rod means.

16. An arrangement according to claim 14, in which said movable coil magnet is adapted to receive a number of impulses in conformity with the number of adjusting steps to be performed by said ratchet wheel.

17. An arrangement according to claim 15, which includes an acknowledgment switch operable by said second push-rod means.

18. An arrangement according to claim 12, in which said adjusting device comprises two ratchet wheels with the ratchet teeth thereof respectively directed in opposite direction to each other and also includes pawl means respectively arranged for cooperation with said ratchet wheels, both of said ratchet wheels being coupled to said adjusting shaft.

19. An arrangement according to claim 18, which includes a shaft common to and connected to said ratchet wheels and also includes manually operable means connected to said common shaft for manually actuating the same.

20. An arrangement according to claim 12, which includes means for varying the stroke of said pawl.

21. An arrangement according to claim 20, in which each pawl forms a two-arm lever with one arm forming a ratchet nose for engagement with the respective adjacent ratchet wheel, and adjustable stationary abutment means for acknowledgment with the other arm of said two-arm pawl for varying the maximum tilting angle of said pawl.

22. An arrangement according to claim 21, in which said other arm has a curved sliding surface adapted to be engaged by said adjustable abutment means.

23. An adjusting device for tool carriers, especially for boring bars for fine-boring machines, which includes: a spindle head, a boring spindle rotatably journalled in said spindle head and provided with a hollow conical section, a tool carrier supported by said boring spindle and provided with a conical portion mounted in said conical section and rotatably adjustable therein, said tool carrier being eccentrically arranged with regard to said boring spindle, means operable to limit the rotative adjustment of said conical portion with regard to said boring spindle, and means for holding said conical portion and said spindle in their respective adjusted relative position with regard to each other.

24. An arrangement according to claim 23, in which the means operable to limit the rotative adjustment of said conical portion with regard to said boring spindle include abutments respectively connected to said conical portion and to said boring spindle.

25. An arrangement according to claim 23, which includes two abutments on said conical portion and two abutments on said boring spindle for determining the maximum rotative adjustment angle of said conical portion and thereby of said work piece carrier with regard to said spindle.

26. An arrangement according to claim 24, in which the abutments of said cone and said boring spindle are provided with abutting surfaces facing each other.

27. An arrangement according to claim 25, in which the abutments are so arranged that when two abutments engage each other, the other two abutments are located in a diametrical plane.

28. An arrangement according to claim 24, in which the means operable to limit rotative adjustment of said conical portion with regard to said boring spindle include pins which within the range of the abutment surfaces are halved along their diametrical plane.

29. An adjusting device for tool carriers, especially for boring bars of fine-boring machines, which includes: a spindle head, a boring spindle rotatably journalled in said spindle head, a tool carrier supported by said boring spindle and eccentrically arranged with regard thereto, said tool carrier and said boring spindle being rotatable adjusted with regard to each other, and means for holding said spindle and said tool carrier in their respective adjusted relative position with regard to each other, said tool carrier being tiltable about an axis approximately perpendicular to the longitudinal axis of said tool carrier and to the direction in which said tool carrier is adjustable relative to a work piece to be machined.

30. An arrangement according to claim 29, which includes spring means acting upon said tool carrier in a direction approximately opposite to the radial direction in which the tool carrier is adjustable relative to a work piece to be machined.

31. An arrangement according to claim 3, which includes a hinge member interconnecting said tool carrier and said adjusting bar, the axis of said hinge member extending substantially transversely to said boring spindle.

References Cited by the Examiner
UNITED STATES PATENTS 2,289,069    7/1942    Radermacher.
2,867,031    1/1959    Briney et al.

WILLIAM W. DYER, Jr., *Primary Examiner.*

G. A. DOST, *Assistant Examiner.*